Patented Apr. 10, 1951

2,548,690

UNITED STATES PATENT OFFICE 2,548,690

SOLDERING FLUX

Cecil A. Vieno, Duluth, Minn.

No Drawing. Application October 20, 1949,
Serial No. 122,595

3 Claims. (Cl. 148—24)

This invention relates to an improved soldering flux particularly adapted for use in the repair of automobile bodies and the like.

There has been a long search for a soldering flux which is easy and convenient to use, and one which gives grade A results with least waste. In addition, there has been a great need for a soldering flux which melts at a low temperature to reduce the buckling and warping which occurs when soldering large metal sheets.

It is one of my principal objects to fill this long felt need for a good soldering flux. The soldering fluxes which are now in everyday use are in powdered form and are very inconvenient and difficult to use. For example, in using common soldering fluxes, the surface to be soldered must be heated before the flux is applied, and the flux, which is in powdered form, must be picked up out of a can with a suitable blade-like instrument and spread on the surface while the latter is hot. The handling of the powdered flux on a blade is, in itself, quite a difficult feat, and at the same time heat must be maintained on the surface to be soldered. Much waste of flux results in this method.

In addition, the relatively high heat that must be applied to the surface in order to melt the flux causes warpage and buckling in the metal of the auto body, especially in modern vehicles where relatively large sheets of metal have compound curvatures and great stresses may be present therein.

Another means employed to put common soldering flux in an area to be soldered is to use steel wool and dip it into the can of powdered flux to pick up as much as possible, then rub the flux over the heated area. This method usually results in burned fingers, to say nothing of the waste of flux when trying to carry a lot of it on a piece of steel wool.

It is one of my principal objects to provide a soldering flux which may be applied to a surface to be soldered without preheating the surface and thereby eliminate one of the potential warping or buckling possibilities.

Another object is to provide a flux which is in plastic form so that it can be handled more easily and with least waste of the material.

The commonly used soldering fluxes use such chemicals as zinc chloride and ammonium chloride which the better ones of the known materials suitable for the purpose. These chemicals prove to absorb moisture rapidly, even from the air, and are thereby spoiled for use as a soldering flux. In order to retard the moisture absorption of the flux material, a suitable chemical, such as zinc sulphate is mixed with the materials. However, the absorption rate is only retarded, not stopped.

It is, therefore, another of my principal objects to provide a flux which, while containing the best of the known materials for the purpose, will not absorb any appreciable amount of moisture, thereby eliminating waste of material through spoilage.

Another disadvantage of common fluxes is that they have a relatively high melting point; zinc chloride and ammonium chloride having a melting point of about 355° centigrade. This requires a high degree of heat to melt the flux so that it will be effective, and this high temperature, of course, increases the tendency and possibilities of the metal to buckle and warp.

It is another of my principal objects to provide a flux which has a materially reduced melting point while still using the most efficient of flux materials.

Another object is to provide a flux material which includes a quantity of tinning material whereby the surface to be soldered may be cleaned and tinned in one operation.

These and other objects and advantages of my improved soldering flux will become more apparent as the description thereof proceeds.

My composition comprises one part of ammonium chloride, three parts of zinc chloride, and three parts of glycerine, the parts being measured by weight. My chemical process comprises mixing the above ingredients, then heating the mixture until the ammonium chloride and the zinc chloride are dissolved in the glycerine forming a clear liquid. The resulting compound is allowed to cool to room temperature when it becomes the viscosity of a thin grease. The flux may then be packaged for marketing, preferably in a collapsible lead tube which makes it very convenient to use my flux, it being in plastic condition.

The proportions above mentioned are critical. By mixing one part of ammonium chloride to three parts of zinc chloride a eutectic is arrived at which lowers their melting points about 100° C., making the heat required to use the flux 100° C. less than is required in present day fluxes. My flux melts at about 255° C. rather than 355° C. which is required by presently known fluxes. This, obviously, reduces the possibilities of the metal being soldered becoming warped or buckled.

By using three parts of glycerine with the above proportions of zinc chloride and ammonium chloride the viscosity of the product is maintained at that of heavy grade motor oil or thin grease, which is the most convenient form for using the flux. If too much glycerine is used the product is too stiff and hard to apply, if too little is used the product is too watery and difficult to handle. My product may be spread on the cold metal in the area to be soldered either with one's finger, a paddle, a piece of cloth, or any desired implement with no difficulty. The plastic flux readily adheres to the metal making it easy to apply the flux even to inclined and vertical surfaces.

The fact that the zinc chloride and ammonium chloride are in solution and chemically combined with the glycerine reduces their tendency to absorb moisture to a point where it is no longer a consideration, thereby overcoming one of the great disadvantages of common fluxes, that of spoilage due to absorbing moisture.

After my flux is smoothed on the area to be soldered, the area may be heated, but to a less high temperature than previously required as above pointed out and solder may be run into place to tin the area and the area filled with filler solder.

I have found that by mixing one part of pulverized tin (or solder) to my flux after it has cooled to the viscosity of thin grease, the solder will remain in suspension in the flux, and an area may be tinned by merely spreading the solder containing flux on the area, heating the area moderately, then wiping it with a rag. An excellent tinning job is thus simply and quickly obtained.

Here again, it is not advisable to vary the proportion of pulverized solder added to the mixture as if too much solder is added, the cost of manufacturing increases and the melting point of the flux is raised, and if too little solder is added the area does not get sufficient tinning.

While I have here described my invention as particularly adapted for use in repairing auto bodies and the like, it is deemed apparent that it may be used in other places to equal advantage within the scope of the appended claims. It is contemplated, for example, that my flux may be used to great advantage in the dairy industry where large vats, etc., in which milk is handled must be tinned regularly.

Having thus described my invention, what I claim is:

1. A soldering flux consisting essentially of a solution of ammonium chloride about one part by weight, zinc chloride about three parts by weight, and glycerine about three parts by weight.

2. A tinning compound for soldering consisting essentially of a plastic solution of about one part by weight of ammonium chloride, about three parts by weight of zinc chloride, and about three parts by weight of glycerine; and about one part by weight of pulverized solder mixed in said solution.

3. A soldering flux consisting essentially of a plastic solution of about one part by weight of ammonium chloride, about three parts by weight of zinc chloride, and about three parts by weight of glycerine.

CECIL A. VIENO.

REFERENCES CITED

The following references are of record in the file of this patent:

UNITED STATES PATENTS

| Number | Name | Date |
|---|---|---|
| 804,664 | Leisel | Nov. 14, 1905 |
| 1,453,080 | Pallady | Apr. 24, 1923 |

FOREIGN PATENTS

| Number | Country | Date |
|---|---|---|
| 224,048 | Great Britain | Nov. 6, 1924 |